Patented June 7, 1938

2,119,565

UNITED STATES PATENT OFFICE 2,119,565

PROCESS OF PRODUCING HYDROGEN

Roger Williams, Wilmington, Del., assignor, by mesne assignments, to E. I. du Pont de Nemours & Company, Wilmington, Del., a corporation of Delaware No Drawing. Application June 25, 1926, Serial No. 118,600

13 Claims. (Cl. 23—212)

This invention relates to a method of manufacturing hydrogen from gaseous mixtures of steam and hydrocarbons with the aid of a catalyst, and particularly to the production of hydrogen of relatively low carbon monoxide content.

Because of the rapidly increasing consumption of hydrogen, particularly in such processes as the hydrogenation of oils and the synthesis of ammonia, the development of an abundant supply of hydrogen at relatively low cost is of great economic importance. Hydrogen has been produced heretofore principally by electrolysis of water, but except where water power is abundant the cost of recovering hydrogen by electrolysis is too great to permit the economic use thereof for many purposes.

It is the object of the present invention to provide a simple and effective process operating at a comparatively low temperature for the production of hydrogen by the catalytic reaction of steam and hydrocarbons, the process being adapted particularly for use in converting the saturated paraffin hydrocarbons such as methane, ethane, propane and the like. These are the principal hydrocarbon constituents of natural gas, coke-oven gas and waste gas from oil cracking processes and an abundant supply thereof is available.

A further object of the invention is to provide a process of manufacturing hydrogen of relatively low carbon monoxide content, such hydrogen being particularly desirable for use in the hydrogenation of oils or the synthesis of ammonia in which the catalysts are poisoned by the presence of carbon monoxide in the hydrogen used.

The production of hydrogen by reaction between steam and hydrocarbon has been suggested heretofore, notably in United States Patents No. 314,342, No. 417,068 and No. 1,128,804, but so far as I am aware none of the processes described has achieved any commercial importance. They are not adapted in any event for satisfactory use in the production of hydrogen from hydrocarbons and of a quality suitable for use directly in the hydrogenation of oils and the production of synthetic ammonia.

There are various reasons for the inoperativeness or nonadaptability of the processes described in the patents mentioned. The process proposed in U. S. Patent No. 314,342 consists in passing steam and hydrocarbons over metallic iron, manganese, copper, lead, tin or zinc, or oxides of these metals heated to a temperature above incipient redness. The metals and oxides mentioned are not, in fact, catalysts for the reaction contemplated and the high temperature called for is unfavorable to the maintenance of catalytic activity because of the resultant changes in the physical form of the material. The process of Patent No. 417,068 depends upon the conversion of a mixture of hydrocarbons, carbon monoxide and steam by passage over nickel or cobalt deposited on pumice by reduction of chlorides of these metals in situ at temperatures from 350° to 400° C. for nickel and 400° to 450° C. for cobalt. The primary difficulty with this process is that neither nickel nor cobalt reduced from the chlorides as described will effect the conversion of hydrocarbons into hydrogen in the presence of steam at the temperatures described in the patent or at higher temperatures up to or above 600° C. It is evident that the conversion obtained in the practice of this process depends solely upon the presence of carbon monoxide, the process being useless for the conversion of hydrocarbons. The process of United States Patent No. 1,128,804 depends upon the use of high temperatures above 700° C. and the use of a nickel catalyst. While it is possible at such temperatures to convert hydrocarbons into hydrogen, the process is in fact useless for the present purposes because the product contains always a large proportion of carbon monoxide.

I have found that in the manufacture of hydrogen from hydrocarbons and steam by contact with a catalyst it is desirable to maintain temperatures materially below 700° C. At the latter temperature catalysts (except such as are very refractory and consequently comparatively inactive) ordinarily suffer considerable deterioration by sintering or other change in physical form. Furthermore, at temperatures of 700° C. or higher the conversion of the hydrocarbons will result in a carbon monoxide content in the resultant gaseous mixture of 10% or more unless the proportion of steam employed is in such excess as to render the process very costly. The reason for this condition is apparent from a consideration of the following reactions:

$$CH_4 + H_2O = 3H_2 + CO$$
$$CH_4 + 2H_2O = 4H_2 + CO_2$$

I have found that at temperatures above 600° C. there is a tendency to follow the first and least desirable of these reactions, whereas at temperatures of 600° C. or below the second reaction prevails with the production, therefore, of the minimum proportion of carbon monoxide.

Nickel alone even with the exclusion of chlorine and other catalyst poisons is not very active for the production of hydrogen by a reaction between steam and hydrocarbons at temperatures below 700° C. I have discovered, however, that by the addition of suitable substances referred to hereinafter as promoters the catalytic behavior of nickel in this reaction can be improved to the extent that the conversion of hydrocarbons into hydrogen becomes practicable at temperatures materially below 700° C. As the promoter I may employ one or more of the following difficultly reducible oxides: cerium oxide, yttrium oxide, thorium oxide, zirconium oxide, molybdenum oxide, vanadium oxide, tungsten oxide, uranium oxide, titanium oxide, glucinum oxide, chromium oxide, aluminum oxide, manganese oxide, silicon oxide, tantalum oxide, boron oxide, zinc oxide, cadmium oxide, potassium oxide and calcium oxide. While the addition of promoters to nickel catalysts is especially advantageous since it permits the production of hydrogen from hydrocarbons and steam at temperatures even below 700° C., the usefulness of such promoted nickel catalysts is not limited to these temperatures. The operation can be conducted, therefore, at higher temperatures provided it be carried out in such a way as to prevent the production of excessive proportions of carbon monoxide, for example, by the use of large quantities of steam; or if, on the other hand, the presence of carbon monoxide is not detrimental to the usefulness of the gaseous product. I have also discovered that more than one promoter may be added to nickel to produce results better than those obtained with the use of a single promoter. Thus, the combination of cerium and aluminum oxides with nickel produces a more effective catalyst than that resulting from the addition of one of these oxides alone to nickel. The term "promoter" as used in the claims hereof includes, therefore, one or more of the elements hereinbefore mentioned as suitable for the purpose.

Another feature of my invention consists in the discovery that the promoting action of a given oxide for the hydrocarbon conversion catalyst is considerably improved if the promoter is combined with the catalyst in the form of a chemical compound. Thus, a compound of nickel and chromium oxide such as nickel chromate is a more active catalyst than a mixture of nickel and chromium oxide. Similarly, nickel borate is a better catalyst than a mixture of nickel and boron oxide.

I have also discovered that the absence of even relatively small proportions of certain substances from the catalyst and the reacting gases is essential to the most efficient conversion of hydrocarbons to hydrogen. Certain substances greatly decrease or even completely inhibit the activity of nickel catalysts for this purpose. Among such substances are the halogens, such as chlorine, and compounds of sulphur. It is, therefore, advisable to avoid the presence of these and other catalyst poisons, for instance, by using salts other than the chlorides in preparing the catalytic materials and by employing gases which are free from compounds of sulphur.

The following examples will serve to indicate the preferred procedure in carrying out the invention, it being understood, however, that the invention is not limited to the details of the operation as herein described.

*Example 1.*—Crush pumice stone and screen to 8–14 mesh. Wash with boiling hydrochloric acid until free from iron and then with boiling distilled water until free from chlorides. After drying at 200° C. stir 100 parts at that temperature into a boiling solution of 50 parts of nickel nitrate and 2.6 parts of cerium nitrate, all of which should be free from sulphur, halogens and other contact poisons, in 70 parts of distilled water. After absorption is complete remove the pumice from the solution and calcine it at 400° C. until the nitrogen oxides have been expelled. Place the product in a silica tube in an electrically heated furnace and heat for one hour in a stream of pure hydrogen at 400° C. and then supply a mixture of 10 volumes of steam and 1 volume of methane, previously freed from contact poisons, by passage over hot copper and through activated charcoal, for example. Maintain a temperature of 500° C. and a space velocity of 250, based on methane. (The space velocity is the volume of gas flowing under standard conditions of temperature and pressure per unit volume of catalyst per hour). The issuing gases should contain 76% to 79% of hydrogen, 1% to 4% of methane, 18% to 19% of carbon dioxide and less than 2% of carbon monoxide (on a dry basis). Throughout the operation all contact poisons should be excluded.

*Example 2.*—A nickel alumina catalyst can be prepared by substituting for the solution of nickel nitrate and cerium nitrate of Example 1 a solution of 50 parts of nickel nitrate and 7.5 parts of aluminum nitrate in 70 parts of distilled water.

*Example 3.*—A nickel alumina catalyst can be prepared also as follows:—Heat a 6% solution of nickel nitrate in distilled water containing 15 parts of aluminum nitrate for each 100 parts of nickel nitrate to 40° C. Add a 6% solution of potassium hydroxide at the same temperature until precipitation is complete. Wash the precipitate by decantation with distilled water, collect on a filter and dry at 110° C. Break up the hard product and screen to the desired size. Such small amounts of potash as are held by the precipitated catalyst after washing as above appear to favorably affect its activity.

*Example 4.*—If the solution for treating the pumice, as in Example 1, comprises 50 parts of nickel nitrate, 2.6 parts of cerium nitrate and 7.5 parts of aluminum nitrate in 70 parts of distilled water, a satisfactory nickel-ceria-alumina catalyst will be produced.

*Example 5.*—The pumice is prepared and treated as in Example 1, the solution for that purpose being made by dissolving 50 parts of nickel nitrate and 5 parts of chromium nitrate in 70 parts of distilled water.

*Example 6.*—A nickel chromate catalyst can be prepared by dissolving 70 parts of nickel nitrate free from sulphate and chloride in 1000 parts of distilled water. Add this solution with stirring to a boiling solution of 55 parts of potassium chromate in 1000 parts of distilled water. Wash the resulting precipitate until free from nitrates by decantation with cold distilled water. Collect on a filter, knead well and dry for 24 hours at 120° C. and for 4 hours at 150° C. Break up the resulting cake and screen to the desired size.

The conversion of the hydrocarbons with steam as described in Example 1 can be carried out in any suitable form of apparatus which is adapted to support the catalyst and to permit the heating thereof during the passage of the gaseous mixture. The heating is essential because the reaction is endothermic and will not maintain itself, therefore, unless a suitable quantity of heat is supplied. While electric heating is suggested, the catalyst chamber can be heated otherwise and the heat should be conserved, of course, by the provision of suitable heat interchangers to permit the transfer of heat from the outgoing product to the entering gaseous mixture.

No explanation or theory is offered as to what changes in physical form or chemical composition may occur in the catalyst in the course of the reduction treatment with hydrogen or during the conversion of hydrocarbons with steam. The term "catalyst" as employed in the claims is intended, therefore, to include the contact mass as prepared as well as any modified form in which it may exist during the reaction.

While the invention will find its widest application doubtless in the conversion of methane since that hydrocarbon occurs most commonly among the compounds which are available for this purpose, it may be useful, nevertheless, in converting the higher homologues of methane, (ethane, propane, etc.), because these react even more readily with steam. Unsaturated hydrocarbons present with the saturated hydrocarbons used may also react but will tend to undergo decomposition with the deposition of carbon. It may be considered advisable, therefore, to avoid the presence of such unsaturated hydrocarbons so far as is possible.

The process as hereinbefore described provides an economical and satisfactory source of hydrogen produced from readily available and relatively inexpensive material. Various changes may be made in the operation as described without departing from the invention or sacrificing any of the advantages thereof.

I claim:—

1. The process of manufacturing hydrogen from steam and a hydrocarbon, which comprises passing a gaseous mixture of steam and a hydrocarbon at a reacting temperature below 700° C. over a catalytic body comprising a catalyst chemically combined with a promoter therefor.

2. The process of manufacturing hydrogen from steam and a hydrocarbon, which comprises passing a gaseous mixture of steam and a hydrocarbon at a reacting temperature below 700° C. over a catalytic body comprising nickel chemically combined with a promoter therefor.

3. The process of manufacturing hydrogen from steam and a hydrocarbon, which comprises passing a gaseous mixture of steam and a hydrocarbon at reacting temperature over a heated catalytic body comprising nickel, and chromium oxide as a promoter.

4. The process of manufacturing hydrogen from steam and a hydrocarbon, which comprises passing a gaseous mixture of steam and a hydrocarbon over a heated catalytic body comprising nickel and chromium oxide at a reacting temperature below 700° C.

5. The process of manufacturing hydrogen from steam and a hydrocarbon, which comprises passing a gaseous mixture of steam and a hydrocarbon over a heated catalytic body comprising a compound of nickel and chromium.

6. The process of manufacturing hydrogen from steam and a hydrocarbon, which comprises passing a gaseous mixture of steam and a hydrocarbon over a heated catalytic body comprising nickel chromate.

7. An improved catalytic body which is active for the conversion of gaseous mixtures of steam and hydrocarbons into hydrogen, comprising a compound of nickel and chromium, the compound being free from halogens and other catalyst poisons.

8. The process of manufacturing hydrogen from steam and a hydrocarbon which comprises passing a gaseous mixture of steam and a hydrocarbon at reacting temperature over a heated nickel catalyst including a promoter selected from the group consisting of oxygen compounds of chromium, molybdenum, tungsten and uranium.

9. The process of manufacturing hydrogen from steam and a hydrocarbon which comprises passing a gaseous mixture of steam and a hydrocarbon at reacting temperature over a heated nickel catalyst including as a promoter a compound of a metal, the oxide of which is difficult to reduce, from the group consisting of chromium, vanadium, potassium and aluminum.

10. The process for the manufacture and production of hydrogen from hydrocarbons which comprises passing a gaseous mixture of steam and a hydrocarbon over a catalytic body comprising nickel activated by the addition of aluminum oxide at a reacting temperature below 700° C.

11. The process of manufacturing hydrogen from steam and a hydrocarbon which comprises passing a gaseous mixture of steam and a hydrocarbon at a reacting temperature below 700° C. over a heated nickel catalyst including as a promoter a compound of a metal, the oxide of which is difficult to reduce, from the group consisting of chromium, vanadium, potassium, and aluminum.

12. The process of manufacturing hydrogen from steam and a hydrocarbon, which comprises passing a gaseous mixture of steam and a hydrocarbon over a heated catalytic body comprising nickel and a promoter therefor at a reacting temperature below 700° C.

13. A process for the manufacture and production of hydrogen from hydrocarbons which consists in treating them with steam at a reacting temperature below 700° C. in the presence of a nickel catalyst activated by the addition of a chromium compound.

ROGER WILLIAMS.

CERTIFICATE OF CORRECTION.

Patent No. 2,119,565. June 7, 1938.

ROGER WILLIAMS.

It is hereby certified that error appears in the printed specification of the above numbered patent requiring correction as follows: Page 3, second column, after line 60, insert the following as claim 14:

14. The process of manufacturing hydrogen from steam and a hydrocarbon which comprises passing a gaseous mixture of steam and a hydrocarbon at reacting temperature over a heated nickel catalyst including aluminum oxide as a promoter.;

and that the said Letters Patent should be read with this correction therein that the same may conform to the record of the case in the Patent Office.

Signed and sealed this 5th day of July, A. D. 1938.

(Seal)

Henry Van Arsdale,
Acting Commissioner of Patents.